United States Patent
Li et al.

(10) Patent No.: US 11,604,829 B2
(45) Date of Patent: Mar. 14, 2023

(54) HIGH-SPEED GRAPH PROCESSOR FOR GRAPH SEARCHING AND SIMULTANEOUS FRONTIER DETERMINATION

(71) Applicant: Wisconsin Alumni Research Foundation, Madison, WI (US)

(72) Inventors: Jing Li, Madison, WI (US); Jialiang Zhang, Middleton, WI (US); Soroosh Khoram, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1148 days.

(21) Appl. No.: 15/340,340

(22) Filed: Nov. 1, 2016

(65) Prior Publication Data

US 2018/0121564 A1    May 3, 2018

(51) Int. Cl.
*G06F 16/901* (2019.01)
*G06F 16/903* (2019.01)
*G06F 16/245* (2019.01)
*G06F 12/02* (2006.01)

(52) U.S. Cl.
CPC ........ *G06F 16/9024* (2019.01); *G06F 12/023* (2013.01); *G06F 16/24569* (2019.01); *G06F 16/90335* (2019.01)

(58) Field of Classification Search
None
See application file for complete search history.

(56) References Cited

U.S. PATENT DOCUMENTS

| | | | | |
|---|---|---|---|---|
| 4,546,429 A | * | 10/1985 | Chan | G06F 13/385 710/45 |
| 6,141,656 A | * | 10/2000 | Ozbutun | G06F 16/24558 |
| 6,877,076 B1 | * | 4/2005 | Cho | G06F 12/0607 711/E12.079 |
| 2011/0119467 A1 | * | 5/2011 | Cadambi | G06N 20/10 712/27 |
| 2012/0317142 A1 | * | 12/2012 | Broecheler | G06F 16/9024 707/770 |
| 2013/0117531 A1 | * | 5/2013 | Grochowski | G06F 12/0864 711/207 |
| 2014/0048937 A1 | * | 2/2014 | Bae | H01L 23/5384 257/751 |
| 2014/0215178 A1 | * | 7/2014 | Li | G06F 9/5066 711/173 |
| 2015/0113514 A1 | * | 4/2015 | Chakradhar | G06F 8/456 717/149 |

(Continued)

OTHER PUBLICATIONS

Rosenfeld et al., Peering Over the Memory Wall: Design Space and Performance Analysis of the Hybrid Memory Cube, 2012 (Year: 2012).*

(Continued)

*Primary Examiner* — Neveen Abel Jalil
*Assistant Examiner* — John J Morris
(74) *Attorney, Agent, or Firm* — Boyle Fredrickson, S.C.

(57) ABSTRACT

A computer architecture for graph processing employs a high-bandwidth memory closely coupled to independent processing elements for searching through a graph using a first set of processing elements operating simultaneously to determine neighbors to a current frontier and second processing elements operating simultaneously to determine a next frontier, this process being repeated to search through graph nodes.

16 Claims, 3 Drawing Sheets

(56) References Cited

U.S. PATENT DOCUMENTS

| | | | |
|---|---|---|---|
| 2015/0127649 A1* | 5/2015 | Felch | G06F 16/2455 |
| | | | 707/737 |
| 2015/0379062 A1* | 12/2015 | Vermeulen | G06F 16/2365 |
| | | | 707/691 |
| 2016/0378791 A1* | 12/2016 | Daga | G06F 16/24569 |
| | | | 707/769 |
| 2017/0031611 A1* | 2/2017 | Atasu | G06F 3/0634 |
| 2017/0346503 A1* | 11/2017 | Mansour | H03M 7/40 |

OTHER PUBLICATIONS

Jialiang Zhang et al. "Boosting the Performance of FPGA-based Graph Processor using Hybrid Memory Cube: A Case for Breadth First Search," In Proceedings of the 2017 ACM/SIGDA international Symposium on Field-Programmable Gate Arrays, pp. 1-10. 2017; US.

* cited by examiner

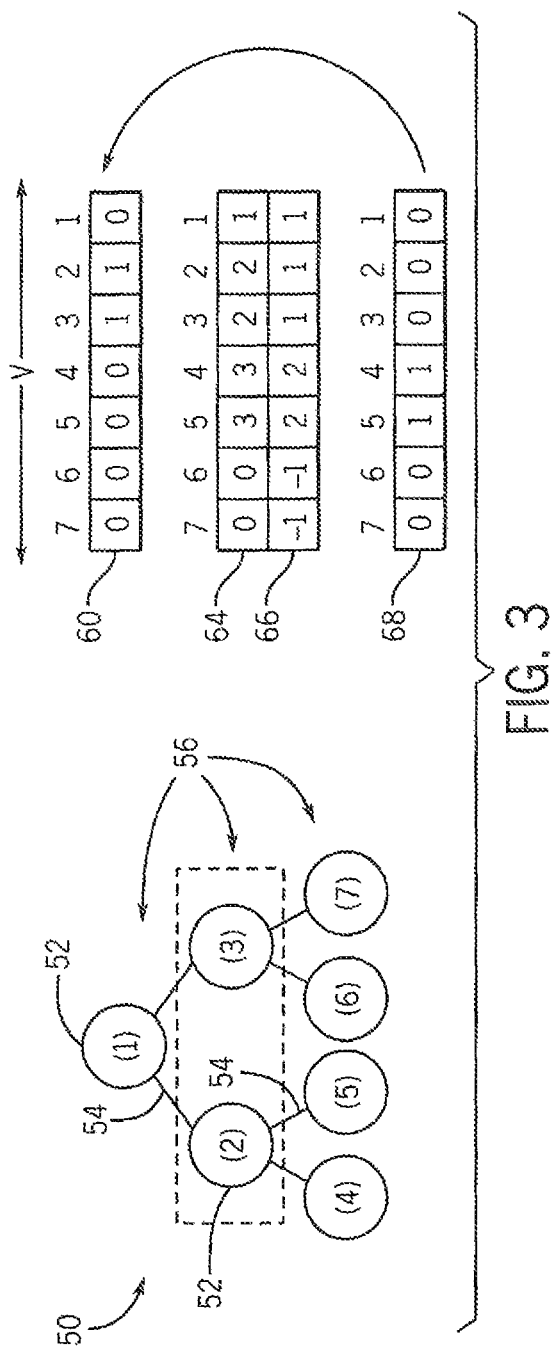
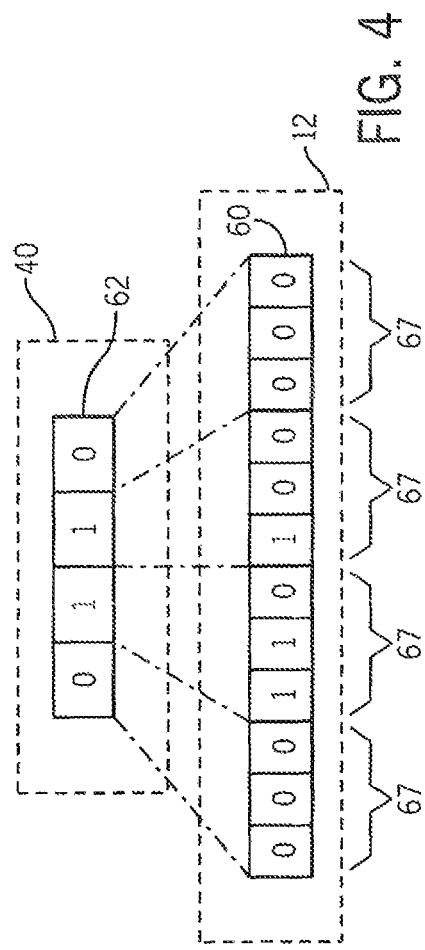
FIG. 3
FIG. 4

HIGH-SPEED GRAPH PROCESSOR FOR GRAPH SEARCHING AND SIMULTANEOUS FRONTIER DETERMINATION

STATEMENT REGARDING FEDERALLY SPONSORED RESEARCH OR DEVELOPMENT

--

CROSS REFERENCE TO RELATED APPLICATION

--

BACKGROUND OF THE INVENTION

The present invention relates to a computer architecture, and in particular, to a computer architecture suitable for problems such as the processing of large, sparse graphs.

A graph is a data structure describing a set of vertices (nodes) interconnected by edges to form a network. Graphs provide a useful model of many real-world structures, for example, relationships between webpages (where the vertices describe webpages and the edges links between webpages) or individuals in a social network (where the vertices describe individuals and the edges describe their friends or interests). Graphs are also used in the fields of neural networks and bioinformatics.

The processing of graphs may be used to answer questions such as: what are the closest connections between two vertices, or what vertices share a particular set of common connections, and the like. Such processing may employ a "breadth first" or similar search to explore the graph moving among vertices according to their edge connections.

Graph data structures can quickly become large making graph processing slow. Currently, the social networking site of Facebook is described by a graph with over 1 billion vertices and more than 1 trillion edges.

SUMMARY OF THE INVENTION

The present invention provides a specialized processor suitable for processing graphs and similar data structures. In this regard, the inventors have recognized that graph processing speed is fundamentally limited by delays in transferring graph data between the memory and processor, a transfer that is exacerbated not only by the large size of the graphs but also by their sparseness which results in random and data dependent memory access patterns that prevent effective use of memory caches to speed data transfer.

For this reason, the present invention provides an architecture that closely couples a high-bandwidth, small access granularity memory (for example, a three-dimensional "memory cube") and a dedicated parallel processor, the latter providing parallel "mapping" and "reducing" that may operate on independent memory channels of the memory, greatly reducing the memory bottleneck for search operations on sparse graphs and the like.

Initial evaluation of this architecture suggests speed gains in the GRAPH500 benchmark of more than three times compared to standard computer architectures using graphs with a scale of 26 and edge factor of 16. Graph scale is the number of vertices in the graph and edge factor is the ratio between the total number of edges and the total number of vertices.

Specifically, the present invention provides a graph processor using a memory closely coupled to a set of independent processing circuits. The memory supports multiple independent memory channels for reading and writing memory data and is adapted to hold a graph data structure describing vertices connected by edges. The independent processing circuits communicate with the memory and program to search through the vertices of the graph data and include: (a) a first set of independent processing circuits operating to identify neighbors to a current frontier of the search by accessing the graph data structure; and (b) a second set of independent processing circuits operating to receive the identified neighbors and determine a new frontier by accessing the result data.

It is thus a feature of at least one embodiment of the invention to make use of high-bandwidth, fine granularity memory architectures, such as three-dimensional memory, to provide a processor well adapted to searches on sparse graphs by using multiple processing circuits associated with the multiple memory channels that may operate in parallel using the different small data accesses.

Multiple of the first set of independent processing circuits may identify neighbors of different portions of the current frontier simultaneously and multiple of the second independent processing circuits may identify portions of the new frontier simultaneously.

It is thus a feature of at least one embodiment of the invention to provide a graph searching process into components that can be made independent with respect to memory access to fully exploit the bandwidth of the memory.

The data accessed in the memory by the first set of independent processing circuits may be disjoint in memory from the data accessed by the memory by the second set of processing circuits for simultaneous access.

It is thus a feature of at least one embodiment of the invention to prevent memory access conflicts between the first and second set of independent processing circuits, for example, as distinct from memory dependence conflicts resulting from one process needing to wait for data produced by another process.

The first and second sets of independent processing circuits may operate on frontiers of a single level of vertices at a time, where a level is determined by edge distance from a source vertex.

It is thus a feature of at least one embodiment of the invention to provide a level "synchronize" process eliminating the complexity of out-of-order processing to provide a simple architecture.

At the conclusion of the calculation of the current frontier and new frontier for a level, the new frontier level determined by the second set of independent processing circuits may become the current frontier used by the first set of independent processing circuits for a succeeding level.

It is thus a feature of at least one embodiment of the invention to provide a recursive search approach simplifying architecture definition.

The second set of independent processing circuits may further write to the result data acquired during the search to the memory.

It is thus a feature of at least one embodiment of the invention to provide an architecture that can perform arbitrary data collection during a searching process using the second set of independent processors.

The result data may be distance for each vertex from a source vertex at which the search started and a father vertex for each vertex.

It is thus a feature of at least one embodiment of the invention to provide a common operation on graphs of determining edge-based distances between nodes.

The memory further holds a bit vector describing the current frontier and a bit vector describing a next frontier in the search and wherein the first set of independent processing circuits reads the current frontier bit vector to identify vertices in the frontier, and the second set of independent processing circuits writes to the new frontier bit vector based on the identified neighbors that have not been searched.

It is thus a feature of at least one embodiment of the invention to provide simple data structures representing search frontiers that can be accessed in portions using the fine granularity of the memory facilitating parallel operation. Ideally the bit vector is greater than the smallest access page of the memory times the number of independent processor circuits in the first or second set. In this way each of the processors can be fully exploited in parallel for processing the bit vector.

The second set of independent processing circuits may write result data associated with each vertex in the next frontier and may determine which of the identified neighbors have not been searched using the result data for those vertices.

It is thus a feature of at least one embodiment of the invention to allow the result data to both record results and to separate identified neighbors determined by the first set of independent processors from the next frontier by eliminating identified neighbors that already have results.

The graph processor may provide a local memory smaller in size than the high-bandwidth memory holding a compressed bitmap smaller than the current frontier bitmap having bits representing compressed form of the frontier bitmap and wherein the first set of independent processing circuits identifies neighbors to a current frontier of the search by first accessing the compressed bitmap and then accessing the frontier bitmap only if the compressed bitmap indicates a set bit will exist in the predetermined range of the frontier bitmap.

It is thus a feature of at least one embodiment of the invention to reduce the need to consume memory bandwidth by examining a small local memory to determine whether a bitmap in memory needs to be accessed.

The bits of the compressed bitmap may represent the logical OR of different predetermined ranges of the frontier bitmap.

It is thus a feature of at least one embodiment of the invention to provide a simple lossy compression system that positively indicates when the bitmap in memory need not be accessed.

The second set of independent processing circuits operates to atomically update the new frontier bit vector and the compressed bit vector.

It is thus a feature of at least one embodiment of the invention to provide a highly parallel operating environment that can use the memory to resolve data access conflicts.

The channels of the memory may communicate serial packets tagged with respect to the independent processing circuit making the access request.

It is thus a feature of at least one embodiment of the invention to provide a mechanism for high-speed asynchronous access to the memory reducing queuing waits.

The number of independent processing circuits may be no less than the number of independent memory channels.

It is thus a feature of at least one embodiment of the invention to fully utilize the multiple channels of memory.

The memory may be a three-dimensional memory employing through-silicone-vias.

It is thus a feature of at least one embodiment of the invention to provide a memory that may be closely integrated into the architecture of the present invention by employing a highly dense memory array.

These particular objects and advantages may apply to only some embodiments falling within the claims and thus do not define the scope of the invention.

BRIEF DESCRIPTION OF THE DRAWINGS

FIG. 3 is a logical representation of a simplified graph showing memory structures of a current frontier bitmap, a next frontier bitmap and a result array recording level and father information showing operation of the mapper elements and reducer elements implemented by the present architecture; and FIG. 4 is a logical representation of a current frontier bitmap implemented with one layer of indirection for reduced memory access bandwidth consumption.

DETAILED DESCRIPTION OF THE PREFERRED EMBODIMENT

Figure 1:
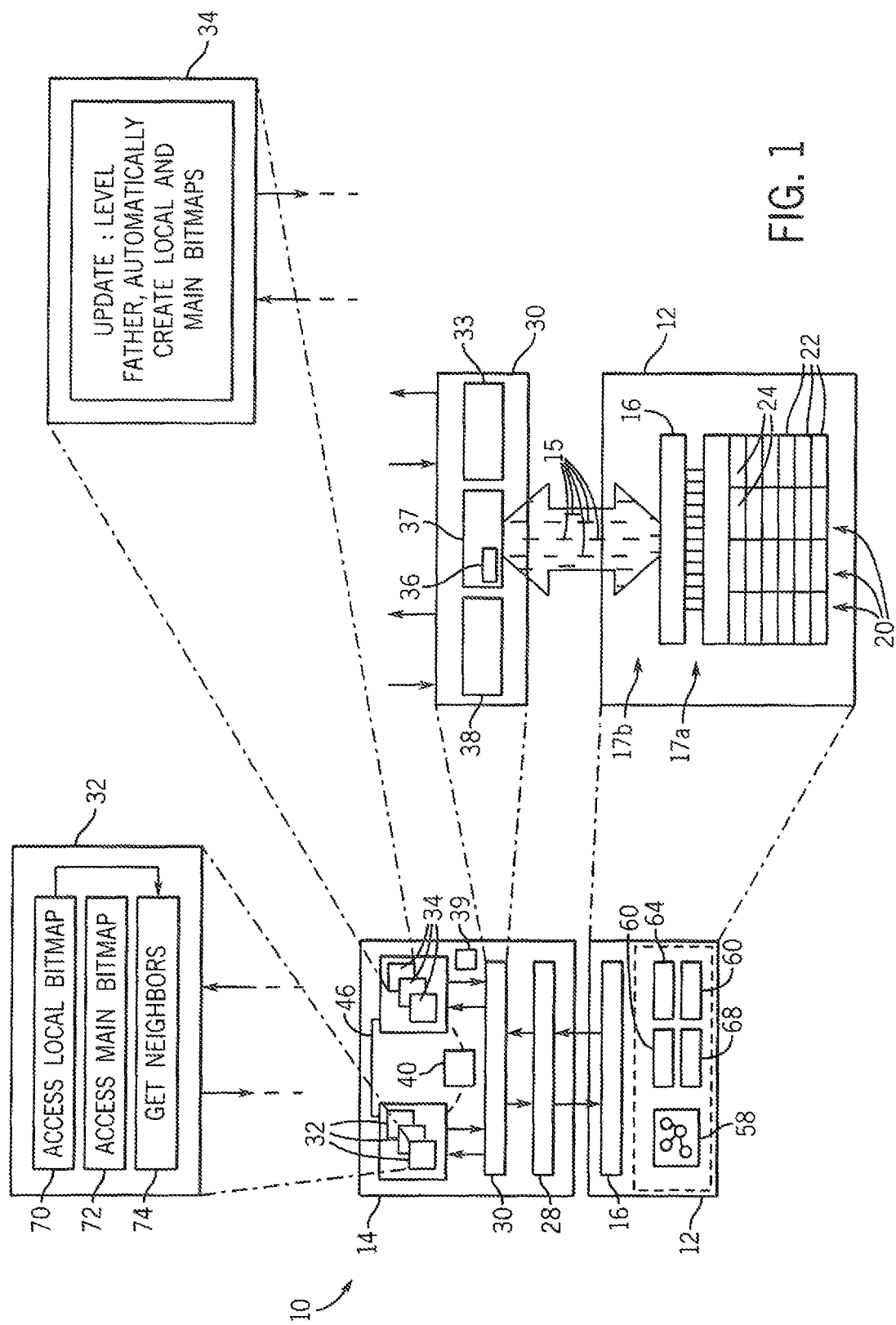
FIG. 1 is a block diagram of the architecture of the present invention showing a processing unit coupled to a high-bandwidth memory and indicating in several exploded details, the independent mapper elements and reducer elements and an interconnect operating between the mapper elements and reducer elements and the high-bandwidth memory.

Referring now to FIG. 1, a graph processor 10 of the present invention may provide for a high-bandwidth memory 12 closely coupled to a processor unit 14, for example, incorporated into the same integrated circuit or adjacent integrated circuits for high-speed communication.

The high-bandwidth memory 12 may provide data access through multiple independent lanes 15 (being logical channels that may differ from actual physical connections) using full-duplex packetized communication. Each packet can include a tag (for example, identifying the source of the memory access request and the destination for the accessed data) as well as a desired address of the data being accessed and may allow several different access granularities. In one embodiment the granularity may range from 16 bytes to 128 bytes of data. This ability to provide for adjustable and low granularity allows optimizing the data transfer to prevent the transfer of data that is not required for a calculation but that would otherwise be counted against the total bandwidth available between processor unit 14 and memory 12.

The independent links 15 may be implemented by a group of serializer/deserializer circuit (links) 16 communicating parallel data 17a with storage elements of the memory 12 and translating the parallel data 17a to or from serial packet data 17b providing communication with the processor unit 14.

The memory 12 may be organized into multiple vaults 20 that can be simultaneously and independently accessed. The vaults 20 are divided into multiple banks 22 providing memory cells connected using vertical (through-silicone-vias) TSV technology and are each managed by a vault controller 24. Addressing the memory 12 employs an address consisting of a vault address, a bank address, a random access row and column address (within a bank) and a byte address. The granularity of data exchange may be 16 bytes, 32 bytes, 64 bytes or 128 bytes controlled by the size of the bite address. Generally, each packet may provide data from only one vault 20.

In one embodiment, the high-bandwidth memory 12 may be a Hybrid Memory Cube (HMC) memory constructed according to the specifications of the Hybrid Memory Cube Consortium being a joint collaboration between Micron and Samsung working with a variety of other manufacturers with components commercially available from Micron under the tradename HMC Gen2 (HMC-15 G-SR). This device generally provides extremely high bandwidth (amount of data transfer per second) providing two links (memory channels) of full duplex communication each consisting of eight 15 gigabits per second lanes, and providing a total bandwidth of 30 gigabytes per second. Other HMC components can support up to 4 links, each with sixteen 30 gigabits per second lanes, and a aggregated bandwidth of 240 gigabytes per second.

The processor unit 14 will generally be a monolithic integrated circuit to provide for high-speed interconnection between its elements with short run lines but may be any similar structures including hybrid integrated circuits comprised of multiple interconnected integrated circuits assembled using integrated circuit technologies. The processor unit 14 is preferably a dedicated integrated circuit (for example, implemented using an FPGA) rather than the general-purpose computer processor.

The processor unit 14 provides two pools of independent processing circuits. The first pool comprises a set of independent mapper elements 32 and the second pool a set of independently reducer elements 34, each which will be described in greater detail below. In this context, independence generally indicates that each of these mapper elements 32 and reducer elements 34 may execute in parallel. Generally, the number of mapper elements 32 and reducer elements 34 will be no less than the number of independent lanes 15 of the memory 12 to maximize the potential for data transmission.

The memory 12 connects to the processor unit 14 using a shared memory controller 28 that converts the high-speed data from the lanes 15 to and from the memory 12 into parallel lower speed data compatible with the processor unit 14. This shared memory controller 28 in turn communicates with interconnect circuit 30 which includes buffers and serves to dynamically match data received from the memory 12 in serial packet data 17b associated with previous corresponding data requests from various mapper elements 32 and reducer elements 34, to the appropriate requesting mapper element 32 and reducer element 34.

In this regard, the interconnect circuit 30 may provide for a downstream queue 33 receiving write requests or read requests from the mapper elements 32 and reducer elements 34 which are then provided to a command buffer 37. Each of these requests includes a tag identifying the particular mapper element 32 or reducer element 34 originating the request. The command buffer 37 logs the tags associated with those requests in a tag memory 36 and the downstream queue 33 buffers those requests as necessary.

Data received from the memory controller 28 by an upstream queue 38 of interconnect circuit 30 (which may also buffer this data) is then passed to the command buffer 37 for matching to a tag in the received data packet using the tags of tag memory 36. This matching allows the interconnect circuit 30 to forward this received data to the requesting mapper element 32 or reducer element 34. As data is received from the memory 12, the tags in tag memory 36 are retired so that the tag memory 36 may be small and buffers are emptied. In this respect, the command buffer 37 of the interconnect circuit 30 serves as a router to ensure that data is correctly provided between individual mapper elements 32 and reducer elements 34 and memory 12 while allowing flexible transmission using a packet system.

As well as communicating data through the interconnect circuit 30, each of the mapper elements 32 and reducer elements 34 may also communicate directly with each other over a dedicated internal on-chip bus 46 that will be described further below. In addition, each of the mapper elements 32 may read from a local memory 40 as will be described below. This local memory 40 is on the same integrated circuit as the mapper elements 32 and reducer elements 34 for high-speed communication and serves to minimize unnecessary communication with the main memory 12.

The processor unit 14 may also include sequencing logic 39 that will serve to advance the searching process in a synchronized fashion through levels as will be described.

Figure 2:
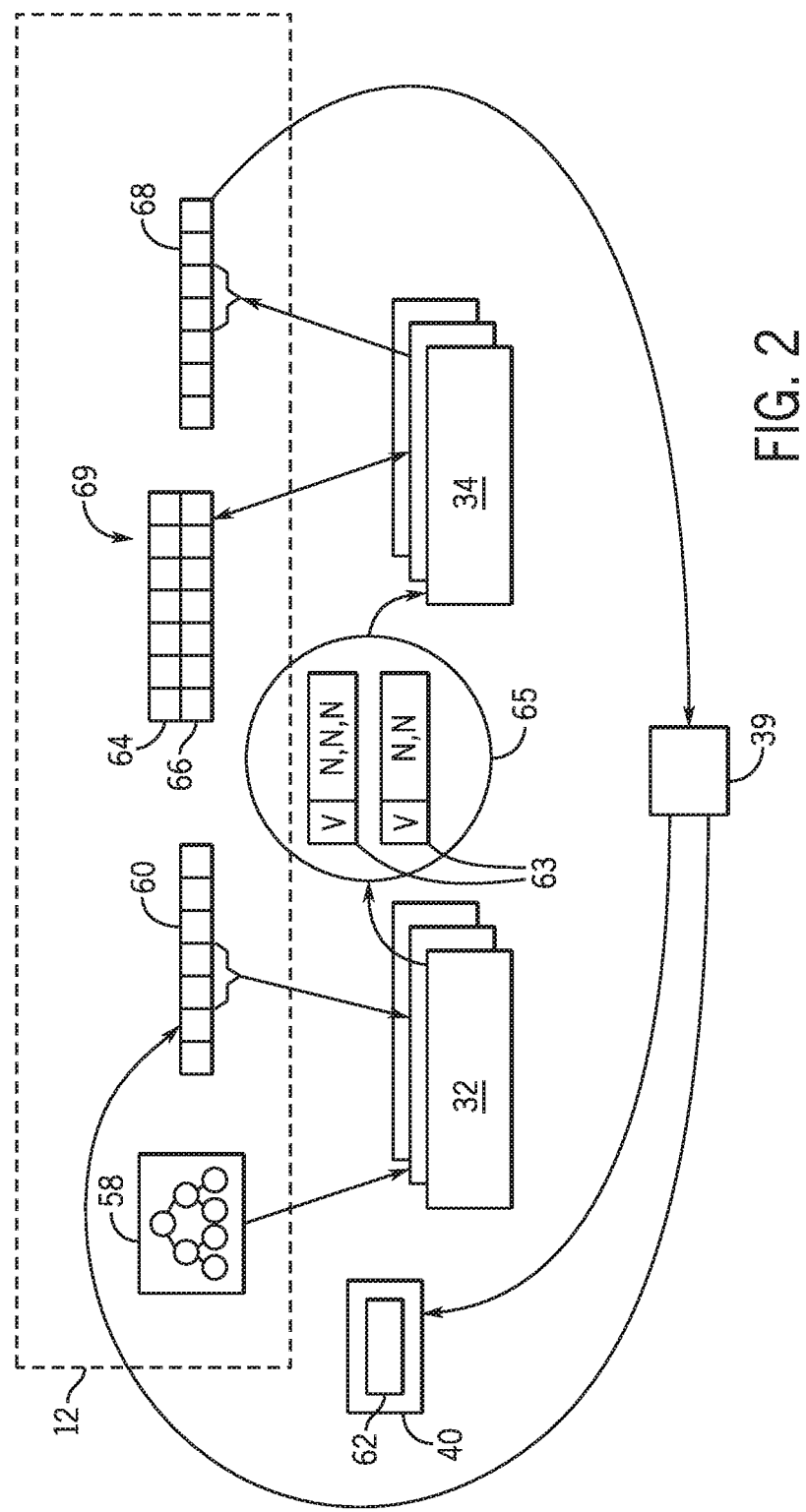
FIG. 2 is a dataflow representation of a single mapper element and reducer element showing the disjoint data used by each element permitting access-conflict-free parallel operation.

Referring now to FIGS. 1-3, the mapper elements 32 and reducer elements 34 may be figured to process a graph 50 logically represented as a set of vertices 52 (in this example labeled (1)-(7) of number V) connected by edges 54. A search may be conducted of the graph 50 starting with a search vertex (labeled (1)) and proceed through various levels 56 determined by the number of edges 54 separating the vertices 52 of the graph 50 from the source vertex (1). The graph 50 may be represented in the memory 12 by a graph description 58, for example, providing a listing of graph vertices 52 and their associated edges 54. In one nonlimiting example, the graph description 58 may be in the form of an adjacency list which provides pointers associated with each vertex 52 that point to different segments of an adjacency array describing each neighbor vertex of vertex 52 connected by an edge 54. Other representations are also contemplated.

In conducting a search of the graph 50, the mapper elements 32 rely on a current frontier bitmap 60 stored in memory 12 providing a bit for each vertex 52 in the graph 50 that represents a frontier in expanding the search of the graph 50. The current frontier bitmap 60 has a size equal to the number of vertices V in the graph 50. Logical bits of the current frontier bitmap 60 are set if the vertex 52 is in the current search frontier representing the boundary between the vertices that have been searched and those that have not been searched.

Multiple mapper elements 32 may read the graph description 58 and the current frontier bitmap 60 in parallel (without data dependency conflicts) because the access is limited to reading. Generally too, each mapper element 32 will read only a portion of the current frontier bitmap 60 taking advantage of the small access granularity of the memory 12 to preserve memory bandwidth.

Using the graph description 58 and the current frontier bitmap 60, each mapper element 32 will a create neighbor lists 63 associating a given vertex indicated by the current frontier bitmap 60 with all other vertices to which it is connected by means of edges 54. As will be described below, these neighbor lists 63 are buffered in a pool 65 directly accessible to the reducer elements 34 over the on-chip bus 46 and thus do not require access to the memory 12 for writing.

The reducer elements 34 also communicate with the memory 12, but with data structures that are disjoint from the data structures accessed by the mapper elements 32 so that there are no data access conflicts that would slow down the reading or writing of this data. In particular, the reducer elements 34 read the neighbor lists 63 and also may read and write a results vector 69 based on the search. As will be discussed below, the results vector 69 may be the desired results of the search of the graph 50; however, the results vector 69 is also used in the process of identifying a next frontier bitmap 68 by the reducer elements 34 and thus provides two functions.

In one embodiment, the results vector 69 may be composed of level vector 64 and father vector 66 each providing an integer value for each vertex 52 in the graph 50. The level vector 64 will store the level of the each particular vertex 52 in the graph 50 and the father vector 66 will store the father of the each particular vertex 52 as deduced during this searching process. Other results can also be accumulated during the searching process and the invention should not be considered limited to this particular result.

Multiple reducer elements 34 may read the neighbor lists 63 from the pool 65 and by reading the results vector 69 may determine which of the neighbors in neighbor lists 63 are new un-searched vertices 52 (and thus not having any results in the results vector 69) and therefore are part of the next frontier bitmap 68 describing the expansion of the search. For this level, for each un-searched vertice 52, a level (being the distance from the source vertex $v_n$ and the un-searched vertex 52) is determined and a father vertex 52 to the uncertain vertex 52 is determined to populate the level vector 64 and father vector 66 for those on searched vertices 52.

Once the steps are complete, the next frontier bitmap 68 will then become the current frontier bitmap 60 and the sequencing logic 39 advances all mapper elements 32 and reducer elements 34 to the next level.

Referring now to FIGS. 1 and 3, each mapper element 32 may execute in a pipeline a set of operations, the first of which is indicated by process blocks 70 and 72 to identify each vertex 52 in the level 56 of the current frontier using the current frontier bitmap 60. Assuming the current level 56 being processed includes vertices (2) and (3), the current frontier bitmap 60 will show a set of zeros except for positions 2 and 3. While the mapper elements 32 may directly access the current frontier bitmap 60 for this purpose, the present invention contemplates that memory 12 bandwidth may be preserved by first consulting a compressed bitmap 62 held in local memory 40 as indicated by pipeline block 70.

As shown in FIG. 4, each bit of the compressed bitmap 62 may map multibit portions 67 of the current frontier bitmap 60 stored in memory 12 by performing a logical OR of the bits in each portion 67 as indicated by pipeline block 70. Thus, for example, a three-bit portion of bit vectors 60 having values 000 will map to a single value of 0 in the corresponding bit of the compressed bitmap 62. Similarly a three-bit portion of the current frontier bitmap 60 having value 010 (or values 001, 011, 100, 110, or 111) will map to a single value of 1 in the corresponding bit of the compressed bitmap 62.

By reviewing the compressed bitmap 62, access to the current frontier bitmap 60 in memory 12, per pipeline block 72, may be completely avoided if the compressed bitmap 62 for the portions of current frontier bitmap 60 of interest, shows a value of zero. Otherwise, bitmap 60 in memory 12 is accessed at pipeline block 72 to determine exactly which vertices 52 are in the relevant portion of the current frontier bitmap 60. In a sparse graph 50, access to memory 12 may be frequently avoided.

At pipeline block 74, for each bit that is set in the current frontier bitmap 60 representing a frontier vertex 52 on the current search frontier through the graph 50, the graph description 58 is examined to identify all neighbor vertices to that given vertex 52. So, for example, for vertex (2) in the current level, neighbor vertices (4) and (5) would be identified. This set of linked vertices (vertex (2) linked to vertices (4) and (5)) provides a neighbor list 63 that is forwarded to the reducer elements 34 through a queue pool 65 that allows any available reducer element 34 to take any available neighbor list 63.

In contrast to the mapper elements 32, the reducer elements 34 execute a single program step on each neighbor list 63, looking at each neighbor vertex 52 to see if that vertex 52 has a corresponding entry (other than a null entry) in the results vector 69 (either father vector 66 or level vector 64) indicating that this vertex 52 has already been reviewed in the searching process. For this purpose the results vector 69 will normally be initialized to null values. If there is other than a null entry for particular neighbor vertex 52, the reducer element 34 writes to the next frontier bitmap 68 a value of one indicating that this neighbor vertex 52 is in the next frontier to be analyzed. The reducer element 34 also writes the level of that vertex 52 into the level vector 64 (being level 2 for vertices (4) and (5)) and the father vertex of those neighbor vertices 52 into the father vector 66 (being vertex (2) for vertices (4) and (5)) being the vertex associated with the neighbor in the neighbor list 63. This process is repeated for each of the set bits of the current frontier bitmap 60.

At the conclusion of the operation of the mapper elements 32 and reducer elements 34 for a given level, the level is incremented after the sequencing logic 39 and the current frontier bitmap 60 are replaced with values of the next frontier bitmap 68. This can be done, for example, without access to the memory 12 by simply swapping address pointers. During this swapping, the mapper elements 32 and reducer elements 34 are restrained from further processing of the next level, for example, by flag bits or the like controlled by the sequencing logic 35. At the same time the compressed bitmap 62 is updated. This updating may be done atomically with the updating of the next frontier bitmap 68 to avoid inconsistencies between the compressed bitmap 62 and the next frontier bitmap 68.

The sequencing logic 39 moves through levels until the entire graph 50 is searched as may be determined by testing whether every value of results vector 69 has a non-null value.

The above process implements a "breadth first search" (BFS) to determine father nodes and levels for all vertices 52. It will be appreciated that this same search strategy may be used for a variety of other graph operations and that this architecture is not limited to particular graph operations.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to an integrated circuit refer to monolithic integrated circuits or integrated circuits assembled from multiple dies for example using through silicon vias micro bumps or the like providing compact packages for rapid communication It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

What we claim is:

1. A graph processor comprising:
   a three-dimensional memory employing through-silicone-vias supporting multiple independent full duplex memory channels for reading and writing memory data, the memory adapted to hold a graph data structure describing vertices connected by edges; and
   a dedicated integrated circuit providing set of independent processing circuits each communicating with the memory on different memory channels and programmed to search through the vertices of the graph data including:
   (a) a first predefined set of independent processing circuits dedicated to graph mapping and operating in parallel to execute a first task to identify neighbors to a current frontier of the search by accessing the graph data structure in different channels, the first predefined set of independent processing circuits only executing the first task and not a second task; and
   (b) a second predefined set of independent processing circuits different from the first predefined set of independent processing circuits and dedicated to graph reducing and operating in parallel to execute the second task to receive the identified neighbors and determine a new frontier as neighbors not previously in a current frontier, the second predefined set of independent processing circuits only executing the second task and not the first task;
   further including a local memory smaller in size than the memory and holding a compressed bitmap smaller than the current frontier bitmap having bits representing a compressed form of the frontier bitmap and wherein the first predefined set of independent processing circuits identifies neighbors to a current frontier of the search by first accessing the compressed bitmap and then accessing the frontier bitmap only if the compressed bitmap indicates a set bit in the current frontier bitmap.

2. The graph processor of claim 1 wherein multiple of the first predefined set of independent processing circuits identifies neighbors of different portions of the current frontier simultaneously and wherein multiple of the second independent processing circuits identifies portions of the new frontier simultaneously.

3. The graph processor of claim 2 wherein data accessed in the memory by the first predefined set of independent processing circuits is disjoint in memory from data accessed by the memory by the second predefined set of processing circuits for simultaneous access.

4. The graph processor of claim 2 wherein the first predefined set of independent processing circuits and second predefined set of independent processing circuits operate on frontiers of a single level of vertices at a time, where a level is determined by edge distance from a source vertex.

5. The graph processor of claim 4 wherein at a conclusion of calculation of the current frontier and new frontier for a level, the new frontier level determined by the second predefined set of independent processing circuits becomes the current frontier used by the first predefined set of independent processing circuits for a succeeding level.

6. The graph processor of claim 1 wherein the second predefined set of independent processing circuits further writes result data acquired during the search to the memory.

7. The graph processor of claim 6 wherein the result data is distance from a source vertex at which the search started and a father vertex for each vertex.

8. The graph processor of claim 1 wherein the memory further holds a bit vector describing the current frontier and a bit vector describing a next frontier in the search and wherein the first predefined set of independent processing circuits reads the current frontier bit vector to identify vertices in the frontier and the second predefined set of independent processing circuits writes to the new frontier bit vector based on the identified neighbors that have not been searched.

9. The graph processor of claim 8 wherein the second predefined set of independent processing circuits further writes result data associated with each vertex in the next frontier and determines which of the identified neighbors have not been searched using the result data for those vertices.

10. The graph processor of claim 1 wherein the bits of the compressed bitmap represent the logical OR of bits of the current frontier bitmap.

11. The graph processor of claim 1 wherein the second predefined set of independent processing circuits operates to atomically update the new frontier bit vector and the compressed bit vector.

12. The graph processor of claim 1 wherein the memory provides at least sixteen independent full-duplex channels for reading and writing.

13. The graph processor of claim 12 wherein the channels communicate serial packets tagged with respect to the independent processing circuit making and access request.

14. The graph processor of claim 12 wherein the number of independent processing circuits is no less than the number of independent memory channels.

15. The graph processor of claim 12 wherein the memory provides for atomic read/write operations.

16. The graph processor of claim 12 wherein the memory provides an access page size of less than 128 bits.

* * * * *